United States Patent Office 3,577,273
Patented May 4, 1971

3,577,273
PRODUCING A TRANSPARENT COPPER COATING ON A SURFACE
Leif Erik Roland Soderberg, Lidingo, Sweden, assignor to Aga Aktiebolag, Lidingo, Sweden
No Drawing. Filed Nov. 12, 1968, Ser. No. 775,174
Claims priority, application Sweden, Nov. 30, 1967, 16,456/67
Int. Cl. H05b *33/28*
U.S. Cl. 117—211                         7 Claims

ABSTRACT OF THE DISCLOSURE

A copper coating having a permanent value of electrical resistance is provided on a non-metallic surface, specially a glass surface, by means of a treatment with a solution of $SnF_2$.

---

The invention relates to producing a transparent coating of copper on a surface of non-metallic material, such as glass plate, to provide a thermoreflective coating which resists oxidation and does not cause pronounced coloring of visible light passing through, and which has a constant value of electrical conductivity without substantially impairing the transparency to visible light.

Copper is known to be sensitive to oxidation and if copper alone is coated onto a glass surface, the resistance increases with time owing to oxidation. It is known from French Patent specification 1,443,428 to protect a metal coating against oxidation by a treatment with $SnCl_2$. A coating which is treated in this manner exhibits substantial variation of the electrical resistance with time and according to the proposal of the specification, an improvement is obtained by means of a treatment with a noble metal salt, such as $AgNO_3$.

The invention is based on the discovery that, for protecting a copper coating and providing a resistance which remains constant over long periods of time, a treatment with $SnF_2$ is markedly superior to treatment with $SnCl_2$ or with any other tin salt known for such purposes. For this result to be obtained, it has proved essential that there be no substantial exposure of the copper coating to oxygen before treatment with the $SnF_2$ solution takes place. The copper-coated surface should preferably be kept wet or, if it is allowed to dry, not be exposed to the atmosphere for more than the order of a minute.

Although the theoretical explanation of the invention is not known, it is believed that there is formed a protective coating not only of tin but also of tin fluoride, which causes the improved protection and constancy of the resistance value.

The invention is applicable to any kind of copper coating deposited according to known methods.

The rinsing referred to below should preferably be performed with deionized water.

EXAMPLE

A coppered glass surface having a protective tin coating thereon may be produced as follows:
Thorough cleaning with a detergent or an abrasive
Rinsing with $H_2O$
Spraying for one minute with a 0.01 to 0.1% (preferably 0.2%) solution of $SnF_2$ having a pH of 3
Rinsing with $H_2O$
Spraying with a solution containing 0.01 to 0.1% (preferably 0.3%) $PdCl_2$, pH=4, for one-half minute
Rinsing with $H_2O$
Treatment for about one minute in a copper solution of the following composition:

$Cu(NO_3)_2$—5 g.
$Ni(O.CO.CH_3)_2$—1 g.
Sodium-potassium-tartrate—50 g.
NaOH—6 g.
Formalin—10 ml.
Water to 1 litre
Temperature—20° C.

Without drying (or only a few minutes after drying), Treatment with an $SnF_2$ solution of between 20 and 60° C. (preferably 40° C.) for between ½ and 10 minutes according to the thickness of coating desired. The solution should contain between 2 and 10 g. per litre of $SnF_2$, the preferred value being 3 g./l.
Rinsing and driying.

The addition of nickel acetate to the copper salt solution is not absolutely necessary but has been found to result in an improvement of the homogeneity both mechanically and optically, i.e. to improve the neutrality of the covering.

The depositing of Sn from the $SnF_2$-solution has been found to be substantially facilitated if a strip of aluminum metal is held in contact with the copper-coated glass plate in the solution.

As was mentioned above, the invention does not depend on the manner in which copper is deposited, but all known coppering baths appear to be usable. Also, the method of bringing on the copper bath is not of importance; spraying or immersion can be used interchangeably as far as the protective action of the $SnF_2$ treatment is concerned.

The lower limit of 2 g./l. for the concentration of the $SnF_2$ solution is not critical, the important factor being whether the protective effect is strong enough. The preferred value will usually be found by tests. The upper limit of 10 g./l. also is not critical. As it is approached there tends to develop inhomogeneous areas and some reduction in transparency.

The duration of the copper bath treatment of course is the controlling influence for the thickness of the copper coating in well-known manner. The limits stated above for the bath correspond roughly to transparencies of 70% and 15% to visible light.

I claim:
1. A method of producing a transparent copper coating on a surface of non-metallic material, comprising the steps of:
   cleaning,
   depositing a transparent coating of Cu on the surface, without any substantial exposure of the Cu to oxygen,
   treatment of the surface with a solution of $SnF_2$,
   cleaning.
2. A method as claimed in claim 1, in which the temperature of the $SnF_2$ solution is between 20 and 60° C.
3. A method as claimed in claim 2, in which the temperature of the $SnF_2$ solution is substantially 40° C.

4. A method as claimed in claim 1, in which the SnF$_2$ solution contains between 2 and 10 grams per litre.

5. A method as claimed in claim 4, in which the SnF$_2$ solution contains 3 grams per litre.

6. A method as claimed in claim 1, in which the duration of the SnF$_2$ treatment is between 1 and 5 minutes.

7. A method as claimed in claim 1, in which the duration of the SnF$_2$ treatment is 3 minutes.

References Cited

UNITED STATES PATENTS 3,382,087  5/1958  Ostrowski _____ 117—35

WILLIAM L. JARVIS, Primary Examiner

U.S. Cl. X.R.

117—213